Patented May 9, 1950

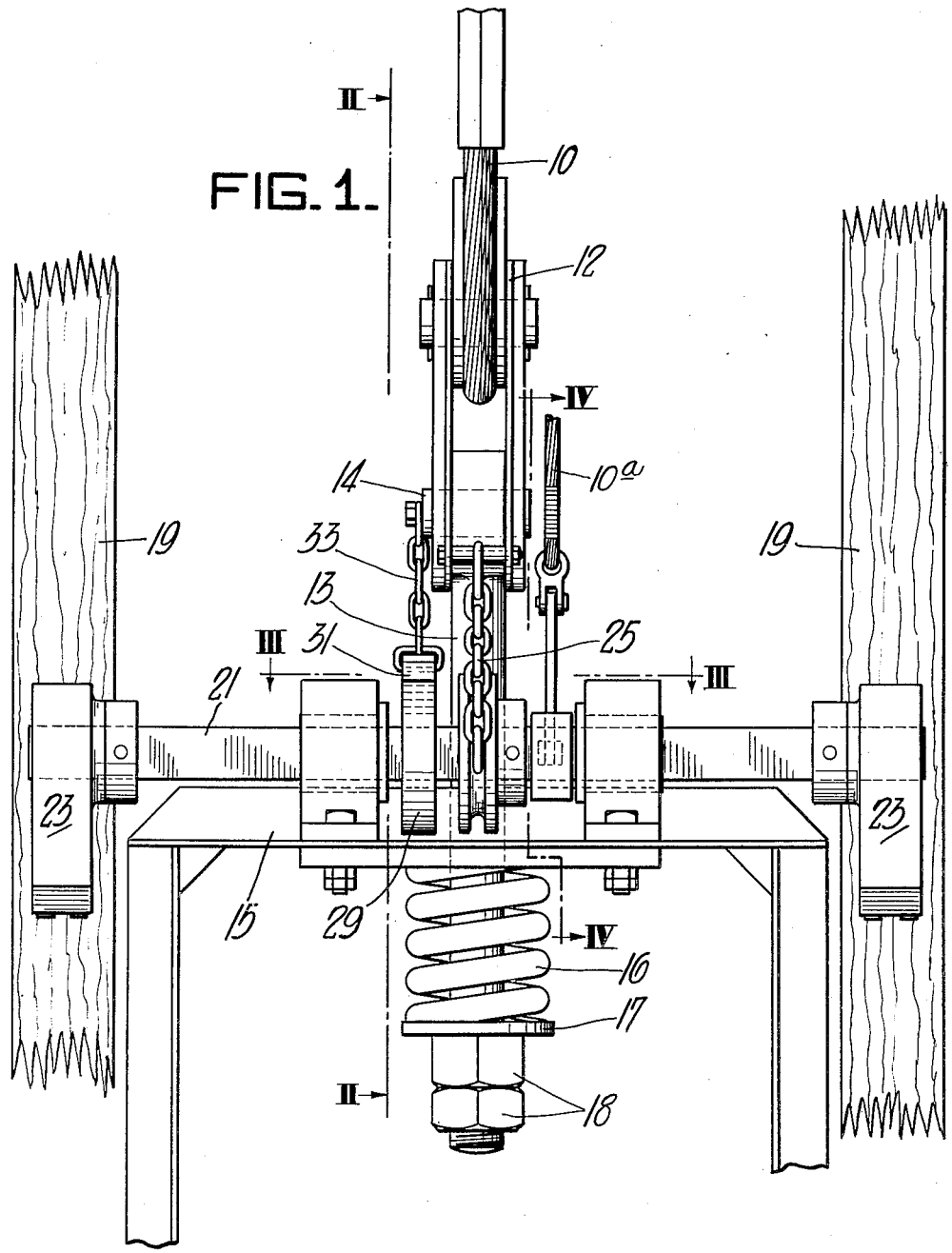

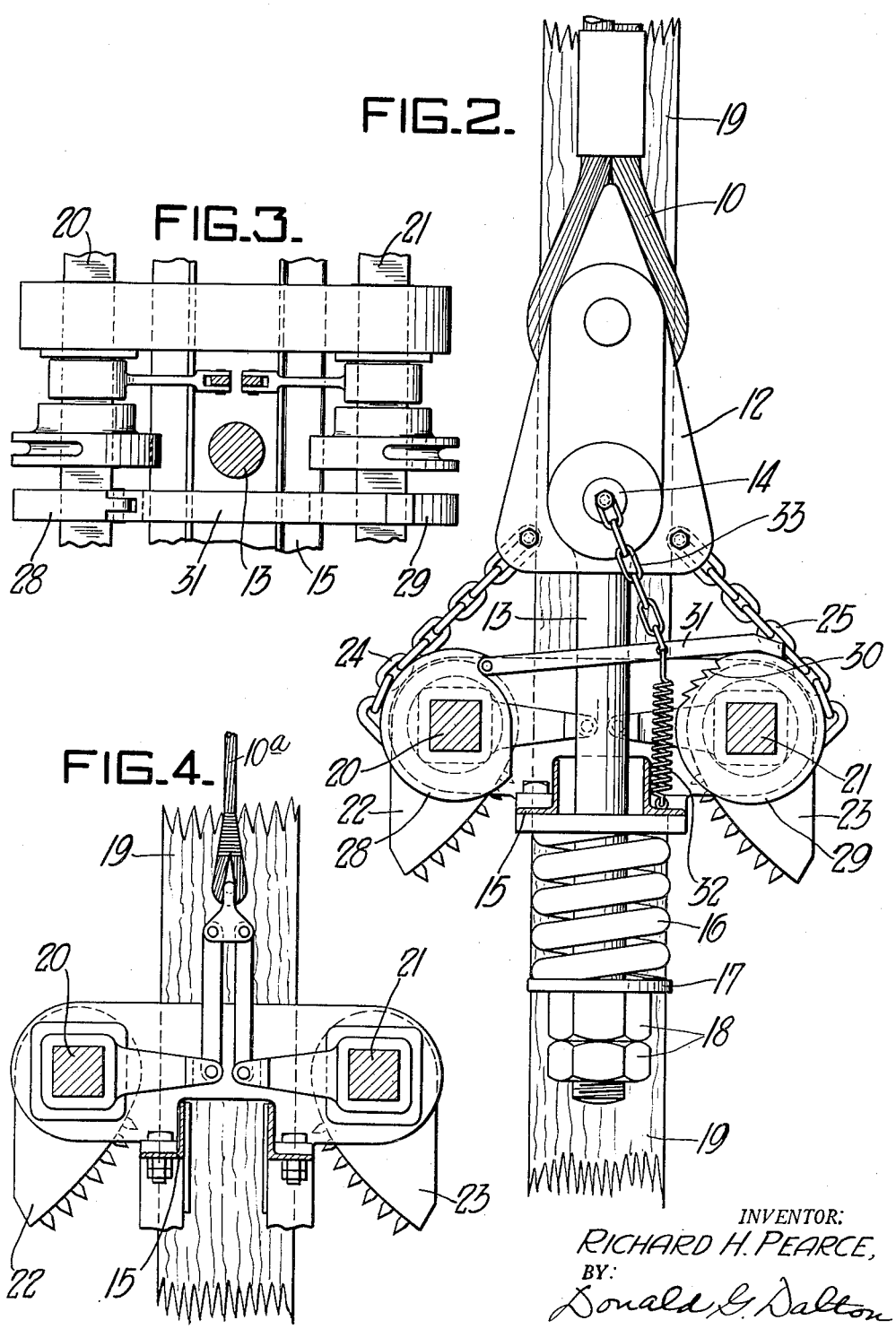

2,507,046

UNITED STATES PATENT OFFICE 2,507,046

SAFETY CATCH FOR ELEVATORS AND THE LIKE

Richard H. Pearce, La Grande, Oreg.

Application June 8, 1948, Serial No. 31,796

3 Claims. (Cl. 187—87)

This invention relates to improvements in safety catches for elevators and the like.

Elevators commonly are equipped with safety catches which hold the elevator in the event the supporting cable fails. Usual catches with which I am familiar comprise dogs adapted to grip the vertical elevator guides, but they lack any positive means for maintaining the dogs in grip. Consequently the dogs may rebound from the guides and thus release the elevator. I am aware of previous mechanisms for positively maintaining the dogs in grip. However, such mechanisms have had the disadvantage that the dogs could not be disengaged readily after the cable has been restored, but could be disengaged only manually and from a relatively inaccessible location.

The principal object of the present invention is to provide improved safety catches for elevators and the like in which the dogs are positively maintained in grip as long as the catch holds the elevator, but are automatically released when tension on the supporting cable is restored.

A further object of the invention is to provide improved safety catches for elevators and the like comprising the usual dogs for gripping the vertical guides and equipped with pawl and ratchet means for automatically locking the dogs in grip on the guides when the supporting cable fails and automatically releasing the dogs when tension on the cable is restored.

In accomplishing these and other objects of the invention, I have provided improved details of structure, a preferred form of which is shown in the accompanying drawings wherein:

Figure 1 is a side elevational view of an elevator mounting which includes an improved catch embodying features of the present invention;

Figure 2 is a vertical sectional view of the mounting taken substantially on line II—II of Figure 1;

Figure 3 is a horizontal sectional view taken substantially on line III—III of Figure 1; and Figure 4 is a vertical sectional view taken substantially on line IV—IV of Figure 1.

Referring more in detail to the drawings:

There is shown at 10 an elevator cable which is attached to a thimble 12. Said thimble supports a king bolt 13 via a draw bar pin 14. The king bolt carries a beam 15 from which the elevator, not shown, is suspended. Preferably beam 15 is resiliently mounted, as on compression spring 16 supported on a washer 17 and nuts 18 at the lower extremity of the king bolt. Vertical guides 19 are provided at the sides of the elevator to guide its movement.

Dog shafts 20 and 21 are rotatably supported by suitable bearings fixed to beam 15 at each side of bolt 13. The extremities of the dog shafts carry cam-shaped, toothed dogs 22 and 23. Chains 24 and 25 are attached to the lower corners of thimble 12 and to the dog shafts for normally holding the dogs out of engagement with vertical guides 19. The elevator mounting has the usual auxiliary cable 10a for operating the dogs on failure of cable 10 (Figure 4). If cable 10 fails, cable 10a rotates dog shaft 20 and dog 22 counter-clockwise, and rotates dog shaft 21 and dog 23 clockwise. The teeth on the dogs thus grip the guides and hold the elevator.

The structure thus far described is fairly conventional for elevator safety catches, and hence is not explained in greater detail. Such structure lacks any positive means for maintaining the dogs in grip on the guides; hence the dogs are likely to rebound from the guides and release the elevator.

In accordance with the present invention, one of the dog shafts, here illustrated as dog shaft 20, carries a pawl collar 28 (Figure 2). The other dog shaft carries a ratchet collar 29, which has a toothed ratchet portion 30. A pawl 31 is pivoted to pawl collar 28 and extends across the mounting where its free end engages the periphery of ratchet collar 29, normally beyond ratchet teeth 30. It is seen that when the dogs are brought into gripping engagement with the vertical guides, rotation of the dog shafts brings the free end of pawl 31 into engagement with ratchet teeth 30. This engagement positively holds the dogs in grip on the guides and prevents the dogs' rebounding.

Preferably, but not necessarily, a tension spring 32 is connected between pawl 31 and beam 15 (Figure 2). The tension spring insures that the free end of the pawl rides against the periphery of ratchet collar 28 and engages the ratchet teeth whenever the parts are rotated to the engaging position. It is apparent, however, that a weight or other type of spring may be substituted for this purpose.

To disengage the pawl automatically from the ratchet teeth when tension and the cable is restored, a chain 33 connects pawl 31 with thimble 12. As soon as tension is applied to cable 10, chain 33 lifts the pawl out of engagement with the ratchet teeth. The dog shafts are then automatically rotated via chains 24 and 25 to the position of disengagement shown in Figures 2 and 4.

From the foregoing it is seen that I have provided a simplified and effective device for insuring that the safety catch is positively mounted in grip whenever there is a cable failure and yet is automatically disengaged whenever the cable is restored.

While I have shown but a single embodiment of the invention it is apparent that modifications may arise. Therefore, I do not wish to be limited by the disclosure set forth but only by the scope of the appended claims.

I claim:

1. An elevator safety catch mechanism comprising a pair of rotatably supported dog shafts, dogs fixed to the extremities of said dog shafts and adapted to grip the elevator guides on failure of the supporting cable, a ratchet carried by one of said dog shafts, a pawl pivotally carried by the other dog shaft and having a free end contacting said ratchet and being adapted to prevent rotation of said dogs away from their gripping position, and means for automatically releasing said dogs and said pawl when tension in the cable is restored.

2. An elevator safety catch mechanism comprising a pair of dog shafts rotatably supported on the elevator cable mounting, dogs fixed to the extremities of said dog shafts on opposite sides of the elevator guides, flexible means connecting the cable mounting and the dog shafts and adapted to rotate the dogs into gripping engagement with the guides on failure of the cable, a ratchet carried by one of said dog shafts, a pawl pivotally carried by the other dog shaft and having a free end contacting said ratchet, said pawl and said ratchet cooperating when said dogs grip the guides to hold said dogs positively in grip, and means for automatically releasing said pawl when tension in the cable is restored.

3. An elevator safety catch mechanism comprising a pair of dog shafts rotatably supported on the elevator cable mounting, dogs fixed to the extremities of said dog shafts on opposite sides of the elevator guides, flexible means connecting the cable mounting and the dog shafts and adapted to rotate the dogs into gripping engagement with the guides on failure of the cable, a ratchet carried by one of said dog shafts, a pawl pivotally carried by the other dog shaft and having a free end contacting said ratchet, said pawl and said ratchet cooperating when said dogs grip the guides to hold said dogs positively in grip, and flexible means connecting the cable mounting and said pawl for automatically lifting said pawl out of engagement with said ratchet when tension in the cable is restored.

RICHARD H. PEARCE.

REFERENCES CITED

The following references are of record in the file of this patent:

UNITED STATES PATENTS

| Number | Name | Date |
| --- | --- | --- |
| 972,252 | Rogers | Oct. 11, 1910 |
| 983,120 | Bryant | Jan. 31, 1911 |
| 2,266,634 | Gross | Dec. 16, 1941 |